US012748337B2

(12) United States Patent
Tossoun et al.

(10) Patent No.: US 12,748,337 B2
(45) Date of Patent: Sep. 29, 2026

(54) PHOTONIC DEVICES HAVING A FIELD-EFFECT TRANSISTOR (FET)

(71) Applicant: HEWLETT PACKARD ENTERPRISE DEVELOPMENT LP, Spring, TX (US)

(72) Inventors: Bassem Tossoun, Santa Barbara, CA (US); Geza Kurczveil, Santa Barbara, CA (US); Di Liang, Spring, TX (US); Stanley Cheung, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 440 days.

(21) Appl. No.: 18/586,023

(22) Filed: Feb. 23, 2024

(65) Prior Publication Data

US 2025/0271725 A1 Aug. 28, 2025

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01)

(58) Field of Classification Search
CPC ............................... G02F 1/2257; G02F 1/212
See application file for complete search history.

(56) References Cited

U.S. PATENT DOCUMENTS 4,958,898 A * 9/1990 Friedman ................ G02F 1/025 257/350
10,133,145 B2 * 11/2018 Song ..................... G02F 1/3133
12,242,142 B2 * 3/2025 Yuan ..................... G02F 1/0151

FOREIGN PATENT DOCUMENTS

CN 105551520 A 5/2016

OTHER PUBLICATIONS

Cheung et al., Heterogeneous III•V/Si No••Volatile Optical Memory: A Mach•Zehnder Memristor, 2022, 2 pages.
Cheung et al., "Non-Volatile Memristive III-V/Si Photonics", IEEE, 2023, 2 Pages.
Huang, Xue, et al. "Heterogeneous MOS microring resonators." 2017 IEEE Photonics Conference (IPC). IEEE, 2017, 2 Pages.
Srinivasan et al "Heterogeneous SISCAP microring modulator for high-speed optical communication." 2020 European Conference on Optical Communications (ECOC). IEEE, 2020, 3 pages.
Tossoun et al., "High-Speed and Energy-Efficient Non-Volatile Silicon Photonic Memory Based on Heterogeneously Integrated Memresonator", Jan. 2024, 44 pages.

* cited by examiner

*Primary Examiner* — John Bedtelyon
(74) *Attorney, Agent, or Firm* — Sheppard Mullin Richter & Hampton LLP

(57) ABSTRACT

Systems and methods are provided for optical devices having a field-effect transistor (FET) for optical tuning. Examples include a device layer formed on a substrate and comprising a first material, and a FET formed on the substrate. The MOSFET comprises a drain formed in the device layer comprising a first doped region, a source formed in the device layer comprising a second doped region, a gate comprising a second material formed on the device layer, and a conductive channel formed in the device layer based on a voltage bias applied to the gate. An optical waveguide is formed between the gate and the conductive channel.

20 Claims, 7 Drawing Sheets

PHOTONIC DEVICES HAVING A FIELD-EFFECT TRANSISTOR (FET)

BACKGROUND

Silicon photonic devices can manipulate light for information processing by altering a refractive index of a silicon waveguide within a photonic integrated circuit (PIC). One example method for altering the refractive index is through electro-optic effects, such as the plasma dispersion effect, which varies free-carrier concentration within the silicon waveguide. Varying of the free-carrier concentration can effectively change the index of refraction of the waveguide. Another example approach is metal-oxide-semiconductor (MOS) capacitor-based modulators that can produce carrier accumulation within a waveguide.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
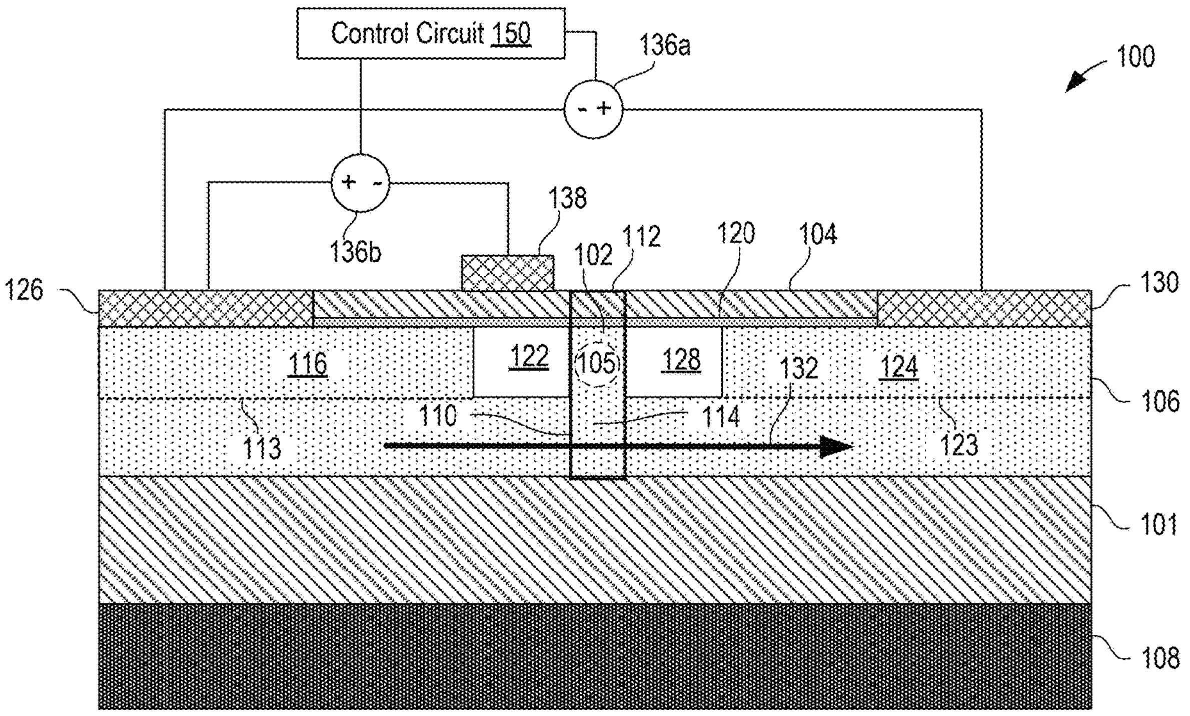
FIGS. 1A and 1B illustrate an example optical device in accordance with implementations disclosed herein.

The figures are not exhaustive and do not limit the present disclosure to the precise form disclosed.

DETAILED DESCRIPTION

Silicon photonics is an evolving field that finds use in various technological fields, such as, but not limited to, communication applications, computing applications, and sensing applications, as well as many others. As outlined above, silicon photonics have been implemented to manipulate optical signals (e.g., light) for encoding and/or decoding of information for processing, for example, by altering refractive indices of waveguides within a PIC. Generally, the refractive index of a waveguide can be altered by tuning a voltage bias across a silicon photonic device, which changes carrier concentration within the waveguide. Changes in carrier concentration induces a change in refractive index that alters a phase of the waveguide. The amount of change induced in a waveguide may be referred to as "modulation depth". Smaller modulation depths (e.g., smaller changes in phase) may require increased precision in the tuning and detection in order to accurately encode/decode information on to an optical signal. However, in conventional silicon photonic devices, larger modulation depths generally require larger regions within the silicon photonic device for altering carrier concentration. Increasing this region can reduce the speed of the device due to signals having to traverse a larger region to induce the desired change, and may require an increased footprint within the PIC itself.

Furthermore, with the advent of memristor photonics, metal oxide-based memristors can be integrated directly onto photonic devices and circuits to provide for non-volatile memory directly on a chip. However, larger voltage biases applied may induce current flow beyond a current limit (also referred to as a current compliance threshold) and exceeding this limit can cause thermal breakdown of the memristor, which can render the device permanently unusable as a memristor. Due to the current limit and a desire to apply as much voltage bias as possible to transition between states of a memristor, it can be difficult to keep the current flowing through such devices below the current limit. Therefore, it may be beneficial to induce current compliance that electrically keeps current in the device below the current limit, which can mitigate thermal break down in order to protect the device.

The technology of the present disclosure provides optical devices that comprise a MOS field-effect transistor (MOSFET) coupled to a waveguide that can be used for various purposes to overcome the above-described technical shortcomings, as well as provide additional benefits. In some implementations, the optical devices disclosed herein can function as an optical modulator with improved modulation efficiency by providing increased modulation depth, which provides for increased range of modulation. For example, the optical devices disclosed herein can provide multiple structures within the device that can be simultaneously or individually tuned to increase the modulation depth of the devices. In this case, the MOSFET may be one such structure that can be tuned by applying a voltage bias to a gate to enter a saturation region of the MOSFET, which can increase the length of a channel and carrier concentration. A second structure can be tuned to accumulate and/or deplete these carriers to other regions within the device. The increased carrier concentration within the device can translate to increased modulation depth.

In another implementation, the disclosed optical devices can function as an optical power monitor within an optical waveguide that does not require extracting an optical signal from the waveguide. For example, the optical device disclosed herein can comprise and/or be integrated into a Mach-Zehnder Interferometer (MZI). In this case, the MOSFET can be tuned to monitor optical power of an optical signal in one arm, which can inform the optical power propagating in another arm of the MZI.

In another example, the disclosed optical devices can also be controlled to limit an amount of current flowing through the device. For example, the optical device may comprise the MOSFET connected in series to another MOS diode (e.g., a memristive structure in various examples). Thus, the MOSFET can be driven by applying a voltage bias at the gate to induce pinch-off of a channel in the MOSFET. The pinch-off can function to limit current flowing through into the memristive structure and, by setting the voltage bias appropriately, can be used to mitigate or avoid thermal breakdown by electrically constraining the current flowing into the memristive device to below a current limit.

Examples of the technology disclosed herein provide for optical devices, such as silicon photonic devices, which can be integrated into silicon photonic platforms and PICs. Examples disclosed herein include a substrate having a device layer formed thereon. The device layer may comprise a first material, such as but not limited to, silicon or other Group IV material. A MOSFET in accordance with the present disclosure is formed on the substrate. The MOSFET comprises a drain, gate, and source. The drain can be formed of a first doped region in the device layer, the source can be formed of a second doped region in the device layer, and the gate can be formed on the device layer. The gate can comprise a second material, such as but not limited to, a Group III-V material. Examples of Group III-V materials that may be used as the second material include, but are not limited to, Indium Phosphide (InP), Gallium Nitride (GaN), and gallium arsenide (GaAs). In an illustrative example, the second material is GaAs. A conductive channel region can be formed in the device layer (e.g., between the source and drain) based on applying a voltage bias to the gate. An optical waveguide can be formed in the device layer above the conductive channel region, for example, between the conductive channel region and the gate.

In some examples, the first and second doped regions comprise a first doping polarity. For example, the first material may be doped with a first doping concentration and the first doping polarity and the first and second doped regions may comprise a second doping concentration that is higher than the first doping concentration. The second material may comprise a second doping polarity that is the opposite of the first doping polarity. For example, the first doping polarity may be p-type doping and the second doping polarity may be n-type doping. In this case, the conductive channel may be a p-type channel. In another example, the doping polarities may be reversed.

Figure 1B:
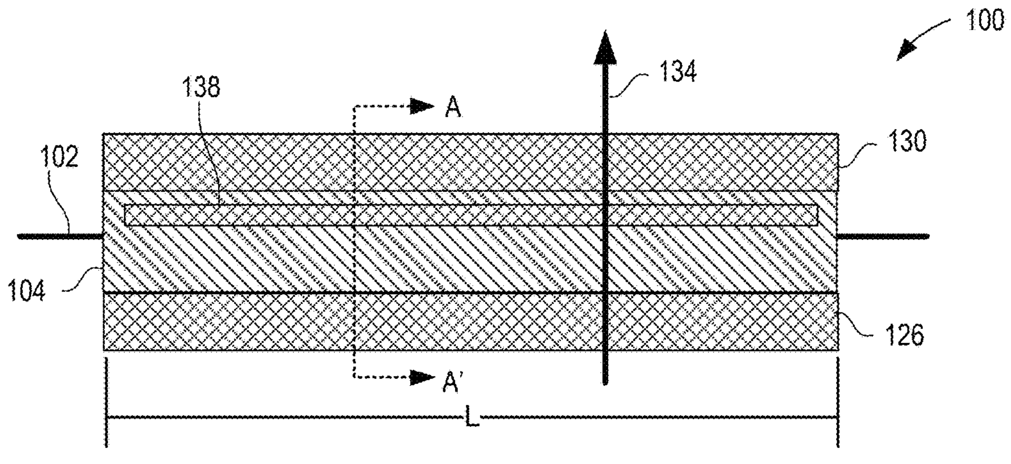

FIGS. 1A and 1B illustrate an example optical device 100 in accordance with implementations disclosed herein. FIG. 1B is a top down view of the optical device 100 and FIG. 1A is a section view of the optical device 100 taken along a line A-A' shown in FIG. 1B. In FIG. 1B, power sources 136*b* and 136*a* are removed for illustrative purposes only. Optical device 100 may be an example of a PIC that can be provided on a chip. In various examples, optical device 100 may be integrated into a silicon photonics platform.

Optical device 100 includes a substrate 108 having a device layer 106 formed thereon. The device layer 106 may comprise a first material, such as but not limited to, silicon or other Group IV material. The substrate 108 may be provided as silicon or other Group IV material. Other examples of materials for substrate 108 may include, but are not limited to, Silicon Nitride ($Si_3N_4$), Aluminum oxide ($Al_2O_3$), Hafnium Dioxide ($HfO_2$), diamond, silicon carbide (SiC), or combinations thereof.

The optical device 100 comprises a MOSFET formed on the substrate 108. The MOSFET can be formed between a drain 124, gate 104, and source 116. The drain 124 can be formed as a first doped region 123 in the device layer 106, the source 116 can be formed as a second doped region 113 in the device layer 106, and the gate 104 can be formed on the device layer 206. The gate 104 can comprise a second material, such as but not limited to, a Group III-V material. Examples of Group III-V materials that may be used as the second material include, but are not limited to, Indium Phosphide (InP), Gallium Nitride (GaN), and gallium arsenide (GaAs). In an illustrative example, the second material is GaAs. A conductive channel 132 can be formed in a region in the device layer 106 based on applying a voltage bias to the gate 104. In various examples, the conductive channel 132 can be a conductive path from the source 116 to the drain 124. An optical waveguide 102 can be formed in the device layer 106 above the conductive channel 132, for example, between the region in which the conductive channel 132 is formed and the gate 104.

While the conductive channel 132 is schematically shown as an arrow, the actual shape of the conductive channel 132 is not intended to be limited to the depicted arrow. The conductive channel 132 may be dependent on the materials (and doping levels) of the optical device 100, as well as the voltage bias applied across the device.

In an example, the first and second doped regions 123 and 113 comprise a first doping polarity. For example, the first material of the device layer 106 may be doped with the first doping polarity (e.g., p-type doping in one example) at a first doping concentration. The first and second doped regions 123 and 113, corresponding to the drain 124 and source 116, respectively, may be doped with the first doping polarity at a second and third doping concentration, respectively, each of which is higher than the first doping concentration (e.g., +p-type doping concentration in this example). In some examples, the second and third doping concentrations are approximately equal. In another example, the second and third doping concentrations need not be the same. The second material forming the gate 104 may comprise a second doping polarity that is the opposite of the first doping polarity (e.g., n-type doping in this example). In this case, when an appropriate voltage bias is applied to the gate 104, as described below in greater detail, the conductive channel 132 (e.g., a p-type channel in the above examples) can be formed that permits current to flow from the source 116 to the drain 124 in a direction illustrated as arrow 134. In another example, the doping polarities may be reversed, in which case the direction of the current may be reversed.

In some examples, a buried oxide (BOX) layer 101 may be grown on the underlying substrate 108 and the device layer 106 formed thereon. In an example, BOX layer 101 may comprise silicon dioxide ($SiO_2$). Trenches 122 and 128, provided for example as air gaps, separates the waveguide 102 from the first and second doped regions 123 and 113 forming the drain 124 and the source 116. The BOX layer 101 may be provided to confine an optical signal 105 propagating in the waveguide 102 in a vertical direction, while the trenches 122 and 128 may be provided to confine the optical signal 105 in a horizontal direction.

Optical device 100 may comprise one or more structures in addition to the MOSFET structure constituted as the source 116, drain 124, and gate 104. For example, as shown in FIG. 1A, optical device 100 may be a hybrid MOS device comprising a capacitive structure 110. In this case, the capacitive structure 110 includes a cathode 112 comprising the second material and formed on the waveguide 102. In the example of FIG. 1A, the cathode 112 may be provided as the gate 104 or a portion of gate 104. The optical device 100 also includes an anode 114 formed in the device layer 106. The anode 114 comprises the waveguide 102. That is, for example, the region of the device layer 106 provided as anode 114 comprises the waveguide 102, as well as other portions of the device layer 106. The anode 114 adjoins the cathode 112, thereby defining a capacitive structure 110 between the anode 114 and the cathode 112. In various examples, the cathode 112 comprises Group III-V material as the second material, in which case the capacitive structure 110 may be considered a MOSCAP.

A dielectric 120 is formed between the cathode 112 and the anode 114. The dielectric 120 may be an electrically insulating material formed between the cathode 112 and anode 114 of the capacitive structure 110, and the polarization of the dielectric 120 by an applied electric field may increase the surface charge of the capacitive structure 110 for a given electric field strength. The dielectric 120 can be native oxides of the cathode or the anode or both, or can be external dielectric materials such as high-k dielectrics or polymers which can be formed by deposition, oxidation, wafer bonding or other dielectric coating methods. In other examples, dielectric 120 may be formed from $SiO_2$, $Si_3N_4$, $Al_2O_3$, polyimides, transition metal oxides (e.g., $HfO_2$, titanium dioxide, zinc oxide, nickel oxide, etc.), organic materials, chalcogenides, 2D materials (e.g., molybdenum disulfide and the like), and ferroelectric materials, among others.

An electrode 126 may be disposed on the second doped region 113 forming the source 116 and an electrode 130 can be disposed on the first doped region 123 forming the drain 124. When a voltage is applied, for example, by power source 136*a*, between the electrodes 126 and 130, carrier accumulation or depletion can occur around dielectric 120. Due to the capacitive structure 110 overlapping with the waveguide 102 (e.g., comprising the waveguide 102), carrier concentration change may lead to changes in refractive index and propagation loss within waveguide 102. By biasing the voltage applied between the electrodes 126 and 130, the refractive index may be changed accordingly, thereby inducing a phase shift modulation. Thus, optical signal 105 propagating through waveguide 102 can be phase shifted based on changes in the refractive index induced by applying a voltage biasing to the capacitive structure 110. The phase shifted optical signal 105 then continues along the waveguide 102. As such, the optical device 100 can be used as an optical modulator.

For example, FIG. 1A includes a power source 136*a*, which can be controlled by, for example, a control circuit 150. The power source 136*a* can act as a signal source and has a negative terminal connected to the electrode 126 and a positive terminal connected the electrode 130. This results in a migration of negative charges from the cathode 112 toward a side of the waveguide 102 adjacent to the cathode 112, and migration of positive charges ("holes") from the anode 114 to an opposite side of the waveguide 102 (also referred to herein as accumulation mode). In other examples the polarity of the power source 136*a* may be reversed. Reversing the polarity of the power source 136*a* causes a migration of negative charges from the waveguide 102 toward electrode 126, and migration of holes from the waveguide 102 toward electrode 130 (also referred to herein as depletion mode).

The dielectric 120 forms at the boundary between the Group III-V material of the cathode 112 and the underlying capacitor portion of the device layer 106. A thin layer (e.g., on the order of tens of nanometers or less) of silicon and the Group III-V oxides can be provided between the cathode 112 and anode 114, from which dielectric 120 forms naturally at this boundary and serves as a dielectric for the capacitive structure 110. In some examples, this thin layer has a thickness on a nanoscale, for example, a few nanometers thick. In some examples, steps need not be taken to encourage the formation of dielectric 120. In other examples, the formation of dielectric 120 may be stimulated, for example by elevating the temperature, exposing the materials to an oxygen-rich atmosphere, or other suitable technique.

The capacitive structure 110 can operate in accumulation or depletion mode. As discussed above, a voltage bias can be applied between the anode and the cathode, causing a thin charge layer to accumulate or deplete on both sides of the dielectric 120. The resulting change in free carrier density causes a change in refractive index (n) of the waveguide 102, which is manifested as a change in the effective refractive index ($\Delta n_{eff}$). The amount of change or modulation in the effective refractive index ($\Delta n_{eff}$) and associated change in optical losses ($\Delta\alpha$) can be described as follows:

$$\Delta n_{eff} = \frac{-q^2\lambda_0^2}{8\pi^2c^2n\varepsilon_0}\left(\frac{\Delta N_e}{m_{ce}^*} + \frac{\Delta N_h}{m_{ch}^*}\right) \qquad \text{Eq. 1}$$

$$\Delta\alpha = \frac{-q^3\lambda_0^2}{4\pi^2c^3n\varepsilon_0}\left(\frac{\Delta N_e}{m_{ce}^{*2}\mu_e} + \frac{\Delta N_h}{m_{ch}^{*2}\mu_h}\right) \qquad \text{Eq. 2}$$

where q is electrical charge applied to the cathode 112 and the anode 114; c is the speed of light in vacuum; $\epsilon_0$ is the permittivity of free space; n is the material refractive index; ΔN represents a change in carrier density, such that $\Delta N_e$ represents the change in carrier density in terms of electrons and $\Delta N_h$ represents the change in carrier density in terms of holes; m* represents the relative effective mass of electrons ($m^*_{ce}$) and holes ($m^*_{ch}$); $\mu_h$ represents the hole mobility; $\mu_e$ represents the electron mobility; and $\lambda_0$ is the free space wavelength.

An optical phase shift (Δφ) in the waveguide 102 induced by the capacitive structure 110 depends on the magnitude of the voltage-induced $\Delta n_{eff}$, the device length L, and the optical wavelength λ of the optical signal 105. In this example, the optical phase shift can be calculated as $\Delta\varphi = 2\pi\, \Delta n_{eff} L\lambda$. Thus, the optical phase of the light within waveguide 102 may be shifted based on the voltage-induced $\Delta n_{eff}$ for a given length L of the optical device 100. Accordingly, the modulation depth of optical phase shift (Δφ) can be increased by increasing the length L of the optical device 100, which can be detrimental in terms of physical footprint on a PIC and processing time.

Accordingly, optical device 100 can leverage the MOSFET formed thereon to increase the modulation depth of optical phase shift (Δφ) by increasing the voltage-induced Δneff of Eq. 1. As such, optical device 100 can be utilized at an optical modulator with improved optical modulation, For example, an electrode 138 may be disposed on the gate 104. A gate voltage ($V_{GS}$) can be applied, for example, by power source 136*b*, connected between the electrodes 138 and 126. The gate voltage ($V_{GS}$) can be applied in a manner to enter saturation mode and form the conductive channel 132. By further modulating the gate voltage ($V_{GS}$) within the saturation mode, a channel length of the conductive channel 132 can be modulated (e.g., through channel length modulation techniques as known in the art), which can function to alter carrier concentration within the region of the waveguide 102. Increasing the carrier concentration within this region means increased density of carriers can be available for accumulation or depletion induced by the capacitive structure 110. That is, for example, increasing the gate voltage ($V_{GS}$) can increase carrier concentration, which alters the change in carrier density (ΔN) of Eq. 1 above and functions to increase the modulation depth.

For example, the MOSFET may comprise a threshold voltage ($V_{th}$) based on the materials and structural dimensions of the source 116, drain 124, and gate 104. The power source 136*b*, which can be controlled by, for example, the control circuit 150 and can be used as a signal source having a negative terminal connected to the electrode 138 and a positive terminal connected the electrode 126. The power source 136*a* can be controlled to tune the gate voltage ($V_{GS}$). When the gate voltage ($V_{GS}$) is greater than the threshold voltage ($V_{th}$), but less than a drain to source voltage ($V_{DS}$), the MOSFET operates in a linear region (known as triode or ohmic mode). During this mode of operation, current entering the drain increases linearly with drain to source voltage ($V_{DS}$). When the gate voltage ($V_{GS}$) is greater than the threshold voltage ($V_{th}$) and equal to or greater than the drain to source voltage ($V_{DS}$), the MOSFET operates in saturation mode. The onset of this mode is referred to as pinch-off, indicating a lack of a conductive channel near the drain. Upon switching to the saturation mode, the current in the drain remains constant with an increasing voltage applied across the drain and source, referred to as a drain-to-source voltage ($V_{DS}$). Upon entering the saturation mode, the conductive channel 132 is formed having a channel length.

In some examples, the gate voltage ($V_{GS}$) can be adjusted to further tune the channel length, for example, through channel length modulation, and carrier concentration in the region of the waveguide 102. For example, in one case, the gate voltage ($V_{GS}$) can be increased leading to increased channel length. In another example, gate voltage ($V_{GS}$) can be decreased leading to a decrease in channel length. By decreasing the channel length, the number of carriers in the gate 138 can be reduced, which can lead to a larger extinction ratio and modulation depth in the modulator. Accordingly, optical device 100 can provide for channel length modulation as an alternative and/or additional type of modulation mechanism to carrier accumulation modulation that can be performed in the MOS capacitor.

In some examples the polarity of the power source 136*b* may be reversed, for example, when the first material is n-type doped. Reversing the polarity of the power source 136*b* causes the direction of the current to be reversed.

Figure 2A:
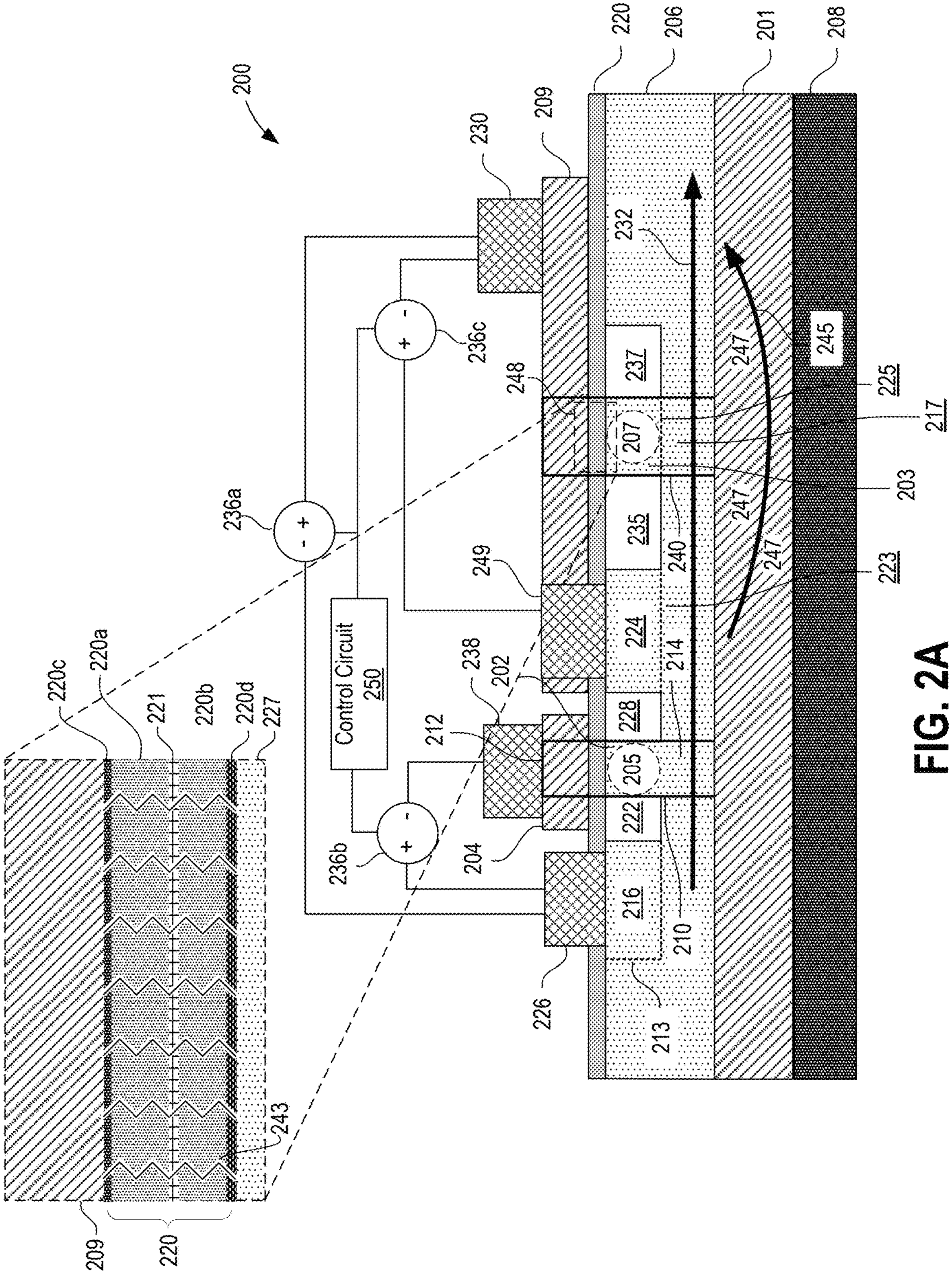
FIGS. 2A and 2B illustrate another example optical device in accordance with implementations disclosed herein.
Figure 2B:
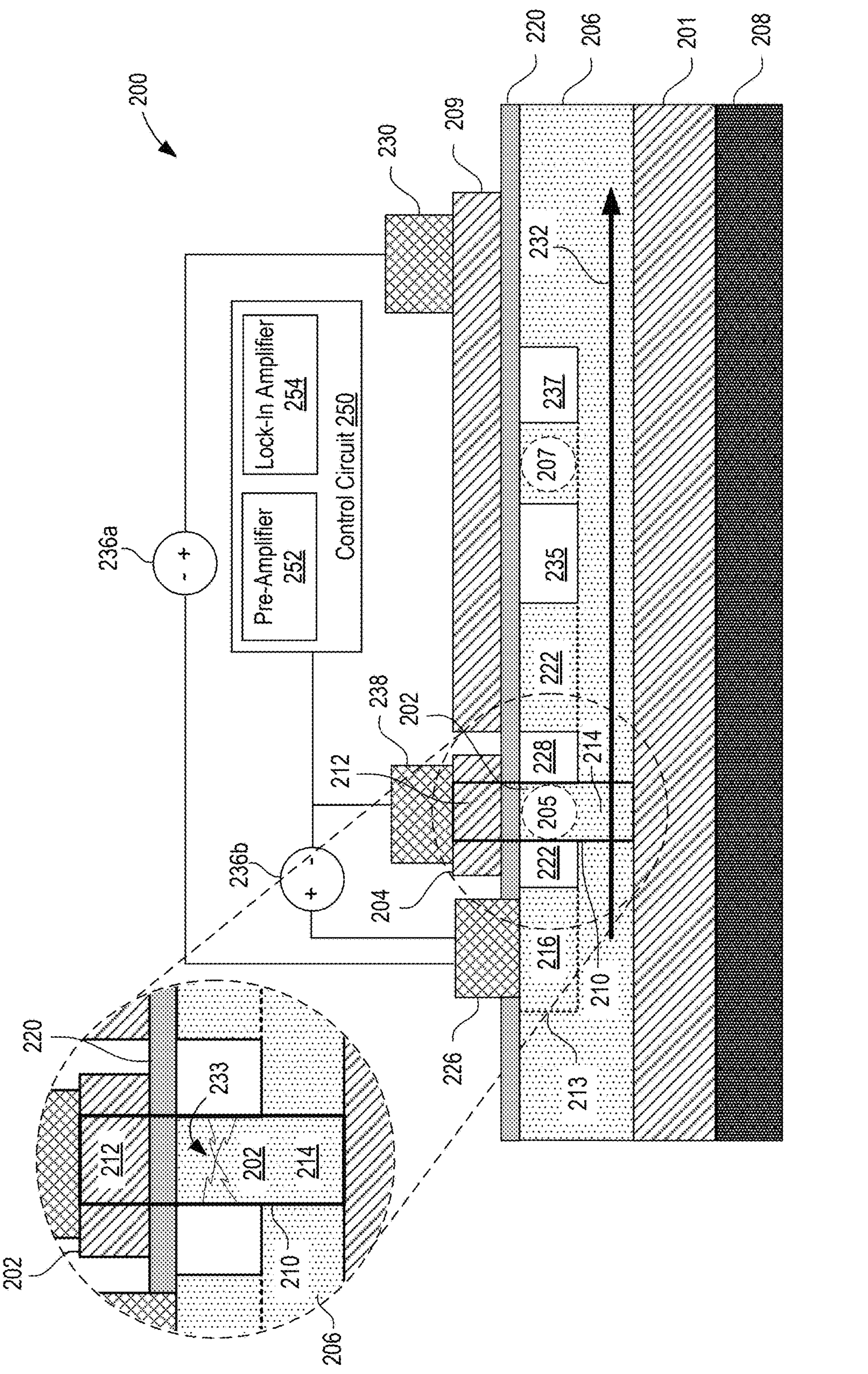

FIGS. 2A and 2B illustrate another example optical device 200 in accordance with implementations disclosed herein. Optical device 200 may be an example of a PIC that can be provided on a chip. In various examples, optical device 200 may be integrated into a silicon photonics platform.

Optical device 200 comprises a substrate 208 having a device layer 206 formed on a BOX layer 201. The substrate 208, device layer 206, and BOX layer 201 may be substantially similar to substrate 108, device layer 106, and BOX layer 101 of FIG. 1A, except as provided herein. For example, device layer 206 may comprise the first material.

The optical device 200 also comprises a MOSFET formed on substrate 208. The MOSFET can be formed between a drain 224, gate 204, and source 216, each of which may be substantially similar to drain 124, gate 104, and source 116 respectively. The drain 224 can be formed as a first doped region 223 in the device layer 206, the source 116 can be formed as a second doped region 213 in the device layer 206, and the gate 104 can be formed on the device layer 206. The gate 204 can comprise a second material, such as but not limited to, a Group III-V material. A conductive channel 232 can be formed in a region in the device layer 206 based on applying a voltage bias to the gate 204, for example, as described in connection with FIG. 1A above. An optical waveguide 202 (e.g., substantially similar to waveguide 102 of FIGS. 1A and 1B) can be formed in the device layer 206 above the conductive channel 232, for example, between the region in which the conductive channel 232 is formed and the gate 204. The first and second doped reigns may be substantially similar to the first and second doped regions described above in connection with FIG. 1A.

While the conductive channel 232 is schematically shown as an arrow, the actual shape of the conductive channel 232 is not intended to be limited to the depicted arrow. The conductive channel 232 may be dependent on the materials (and doping levels) of the optical device 200, as well as the voltage bias applied across the device.

Trenches 222 and 228, provided for example as air gaps, separate the waveguide 202 from the first and second doped regions 223 and 213, respectively. The BOX layer 201 may be provided to confine an optical signal 205 propagating in the waveguide 202 in a vertical direction, while the trenches 222 and 228 may be provided to confine the optical signal 205 in a horizontal direction.

Optical device 200 may comprise one or more structures in addition to the MOSFET structure constituted as the source 216, drain 224, and gate 204. For example, as shown in FIG. 2A, optical device 200 may comprise a capacitive structure 210 that is substantially similar to the capacitive structure 110 of FIG. 1A. For example, capacitive structure 210 includes a cathode 212 comprising the first material and formed on the waveguide 202. The optical device 200 also includes an anode 214 formed in the device layer 206. The anode 214 comprises the waveguide 202. That is, for example, the region of the device layer 206 provided as anode 214 comprises the waveguide 202, as well as other portions of the device layer 206. The anode 214 and cathode 212 may be substantially similar to anode 114 and cathode 112. For example, the anode 214 adjoins the cathode 212, thereby defining the capacitive structure 210, which may be implemented as a MOSCAP. Additionally, a dielectric 220 is formed between the cathode 112 and the anode 114. The dielectric 220 can be substantially similar to dielectric 120 of FIG. 1A.

Accordingly, the capacitive structure 210 can be utilized to induce a phase shift modulation in the waveguide 202, for example, by applying a voltage bias across the first and electrodes 226 and 230. That is, for example, power source 236*a* can be controlled by control circuit 250 to apply a voltage bias, which can be tuned to induce carrier accumulation or duplication around the dielectric 220. Thus, in a manner similar to that described above in connection with FIG. 1A, optical signal 205 propagating through waveguide 202 can be phase shifted based on changes in the refractive index induced by applying the voltage bias to the capacitive structure 210.

Additionally, optical device 200 can leverage the MOSFET formed thereon to increase the modulation depth of optical phase shift by increasing the voltage-induced Δneff of Eq. 1. As such, the optical device 200 can be utilized at an optical modulator with improved optical modulation, That is, as explained above in connection with FIG. 1A, an electrode 238 may be disposed on the gate 204 and a gate voltage ($V_{GS}$) can be applied, for example, by power source 236*b* (e.g., substantially similar to power source 136*b*), connected between the electrodes 238 and 226. The control circuit 250 can be used to control power source 236*b* so to apply a gate voltage ($V_{GS}$) in a manner to operate the MOSFET in saturation mode and form the conductive channel 232. The channel length of the conductive channel 232 can be modulated by increasing the voltage bias, which can function to alter carrier concentration within the region of the waveguide 102 and altering the change in carrier density (ΔN) of Eq. 1.

Additionally, in the example of FIG. 2A, optical device 200 may comprise another capacitive structure 240 connected in series to the MOSFET. More particularly, as shown in FIG. 2A, the capacitive structure 240 is connected in series to the drain 224 of the MOSFET. The capacitive structure 240 comprises a waveguide 203 formed in the device layer 206. The capacitive structure 240 can include a cathode 209 comprising the second material and formed on the waveguide 203. In the example of FIG. 2A, electrode 230 is formed on the cathode 209. The capacitive structure 240 also includes an anode 217 formed in the device layer 206. The anode 217 comprises the waveguide 203. That is, for example, the region of the device layer 206 provided as anode 217 comprises the waveguide 203, as well as other portions of the device layer 206. The anode 217 may be connected to the electrode 226 via the device layer 206 and connected in series with the drain 224, for example, via the cathode 209. The anode 217 adjoins the cathode 209, thereby defining the capacitive structure 240 between the anode 217 and the cathode 209. In various examples, the cathode 209 comprises Group III-V material as the second material, in which case the capacitive structure 240 may be considered a MOSCAP.

As with capacitive structure 210, the dielectric 220 is formed between the cathode 209 and the anode 217. The dielectric 220 may be an electrically insulating material formed between the cathode 209 and the anode 217, and the polarization of the dielectric 220 by an applied electric field may increase the surface charge of the capacitive structure 240 for a given electric field strength. In various examples, the cathode 209 and gate 204 are formed of the same material, in which case the dielectric 220 may be a connected layer formed of a common oxide. In another example, the cathode 209 and gate 204 may be different Group III-V materials, in which case it may be beneficial to provide the dielectric 220 as separate dielectrics having oxides for the materials forming the cathode 209 and gate 204.

In some examples, the capacitive structure 240 may be leveraged as a memristor (in which case the capacitive structure 240 may be referred to as a memristive structure). In this case, the waveguide 203 is formed of a third doped region 225 above the channel region. The third doped region 225 may comprise the first doping polarity and doped with a fourth doping concentration. In some examples, the fourth doping concentration may be approximately the same as the third doping concentration or second doping concentration. Thus, in an illustrative example, the third doped region 225 may comprise p-type doping having a concentration higher than the first doping concentration of the device layer 206.

Applying an electric field across the capacitive structure 240 can form a filamentation layer in the capacitive structure 240 that provides for non-volatile memristive behavior. For example, power source 236*c* can be connect to electrode 230 and an optional electrode 249. The power source can be controlled by control circuit 250 to apply a voltage bias across the capacitive structure 240, which generates charge trap regions 247 forming conductive path 245 within the BOX layer 201. The capacitive structure 240 may be considered to be in an "on" state at this point providing memristive behavior (e.g., non-volatile retention). The conductive path 245 exhibits conductive behavior within the capacitive structure 240. The conductive path 245 and charge trap regions 247 remain even after the voltage bias supplied by power source 236*c* is removed, thereby providing non-volatile retention.

The conductive path 245 formed in the capacitive structure 240 causes the effective refractive index of the waveguide 203 to change. Thus, selective control of the voltage bias applied to capacitive structure 240 through power source 236*c* can be used to form a desired conductive path 245, which tunes the effective refractive index of waveguide 203 and sets an adjustment of the phase of an optical signal on waveguide 203 induced by the changed effective refractive index. Since the conductive path 245 remains when voltage bias is not applied to the capacitive structure 240, tuning of the capacitive structure 240 can be achieved through non-volatile memristive behavior and maintained without a connected power source.

Resetting of the induced phase shift can be reversed by applying a voltage bias by power source 236*c* having a reverse polarity relative to the voltage bias used to form the conductive path 245. The reverse voltage bias can rupture the conductive path 245 by dissipating the charge trap regions 247 and permitting a charge to relocate within the capacitive structure 240. This effectively restores the capacitive structure 240 to the "off" state.

In more detail, electroforming or filamentation can be stimulated by applying an electric field (referred to herein as a "set electric field" or "set voltage bias") across BOX layer 201. The magnitude of the applied electric field may be large enough to stimulate electroforming. For example, by increasing the voltage bias supplied by power source 236*c* to the optional electrode 249 and electrode 230, electroforming can be stimulated in the BOX layer 201 which forms filaments in the dielectric 220 that extend between cathode 209 and anode 217, shown in zoomed in view of capacitive structure 240 as filaments 243. The filaments 243 are depicted as having a shape, but this is for illustrative purposes only and not intended to illustrate the actual shape or structure of filaments 243. The specific shape and structure of the filaments 243 may be dependent on materials (and doping of the materials) forming the various layers and the voltage bias applied to the electrodes 249 and 226 that form the filaments 243.

When the filaments 243 are present, the dielectric 220 may be considered a filamentation layer. The filamentation layer provides an electrical path between cathode 209 and anode 217 that causes charge trap regions 247 to form in the BOX layer 201, which creates a conductive path 245 (shown as an arrow) within the underlying BOX layer 201. In one example, the filamentation layer may create defect sites within the BOX layer 201 that function to trap charges. The charge trap regions 247 operate to hold negative charges within the conductive path 245, thereby inducing a migration of negative charges. This resulting change in free carrier density causes the change in the refractive index of waveguide 203, similar to that described above in connection with Eqs. 1 and 2. Thus, the accumulation of charges BOX layer 201 induces an amount of change in the effective refractive index, which can be selectively set to induce a desired phase shift in an optical signal 207 propagating in waveguide 203, as described above.

While the conductive path 245 is schematically shown as an arrow, the actual shape of the conductive path 245 is not intended to be limited to the depicted arrow. The conductive path 245 may be dependent on the materials (and doping levels) of the optical device 200, as well as the voltage bias applied across the device. Similarly, conductive channel 232 is not limited to the depicted arrow and may be dependent on the materials (and doping levels) of the optical device 200, as well as the voltage bias applied across the device.

In examples, the conductive path can effectively change the resistance of the BOX layer 201, which causes the capacitive structure 240 to switch from capacitive operation to a resistive operation (e.g., the capacitive structure effectively functions as resistor). This change in operation exhibits a conductive behavior provided by filaments 243 subject to a resistance provided by the dielectric layer 220. The conductive path 245 and charge trap regions 247 can remain in the underlying BOX layer 201 in the absence of a voltage bias, thereby providing non-volatile retention. The conductive path 245 causes a further change in the effective index of refraction ($n_{eff}$) of the waveguide 203, which can be used to tune the phase shift ($\Delta\varphi$) induced by the optical device 200. Since the conductive path 245 remains when voltage bias is not applied, phase tuning of optical signal 207 in waveguide 203 can be achieved through non-volatile memristive behavior and maintained in the absence of power supplied to the optical device 200.

As shown in the zoomed in region of capacitive structure 240, a plurality of layers are provided, for example, at the interface between the material of the anode 217 and the material of the cathode 209. The dielectric 220 can be formed at this interface between cathode 209 and anode 217. The interface comprises a plurality of layers 220*a*-220*d* and a bonding interface 221 resulting from wafer bonding of the anode 217 to cathode 209. In various examples, the cathode 209 may be hydrophilic wafer-bonded to the anode 217, such that the material of cathode 209 is bonded to the waveguide 203 resulting in bonding interface 221.

Prior to bonding, layers 220*a*-220*d* are provided that, once bonded, stimulate formation of the dielectric 220, as discussed above. For example, layer 220*d* can be deposited on anode 217 followed by layer 220*b*. Similarly, layer 220*c* can be deposited on cathode 209 followed by layer 220*a*. The materials of layers 220*a*-220*d* may include, but not limited to, $SiO_2$, $Si_3N_4$, $Al_2O_3$, $HfO_2$, polyimide, BCB, polyimides, transition metal oxides (e.g., titanium dioxide, zinc oxide, nickel oxide, etc.), organic materials, chalcogenides, 2D materials (e.g., molybdenum disulfide and the like), and ferroelectric materials, and combinations thereof. In some examples, layers 220*b* and 220*a* may be the same material, which may be different than the materials of layers 220*c* and 220*d*. In an example implementation, anode 217 may be coated with a layer of $SiO_2$ as layer 220*d* followed by a layer of $HfO_2$ as layer 220*b*, while cathode 209 may be coated with a layer of $Al_2O_2$ as layer 220*c* and followed by a layer of $HfO_2$ as layer 220*a*. Each layer may be formed via atomic layer deposition (ALD) or other fabrication techniques as known in the art.

As noted above, the dielectric 220 may be formed between the cathode 209 and the anode 217. The layers 220*a-d* can act to stimulate the formation of the dielectric 220. As discussed above, dielectric 220 may be a thin layer of silicon and Group III-V oxides that forms naturally at the boundary and serves as dielectric 220. In this example, the thin layer is provided as $Al_2O_3$ and $HfO_2$, at the boundary of the anode 217 (e.g., between anode 217 and layer 220*b*), and the dielectric 220 is formed from these layers. In some examples, steps need not be taken to encourage the formation of dielectric 220. In other examples, the formation of dielectric 220 may be stimulated, for example by elevating the temperature, exposing the materials to an oxygen-rich atmosphere, or other suitable technique.

When a high enough voltage bias is supplied across BOX layer 201 to stimulate electroforming, filaments 243 may be formed that transition dielectric 220 to a filamentation layer. As discussed above, formation of the filamentation layer results in formation of the conductive path 245 within underlying BOX layer 201.

Furthermore, the non-volatile phase shift can be reset by applying a voltage bias (e.g., a reset voltage bias) having a reverse polarity relative to the set voltage bias. This reset voltage bias ruptures the filaments 243, thereby removing the filamentation layer. As a result, the conductive path 245 in the BOX layer 201 may be ruptured by dissipating the charge trap regions 247 and permitting charge to relocate within the BOX layer 201. This effectively restores the capacitive structure 240 to a low conductivity state, at which the capacitive structure 240 acts as a capacitor.

As described above, a larger voltage biases applied to a memristor, such as the capacitive structure 240 implemented as a memristive structure described above, can induce current flow beyond a current limit. This current limit may be dependent on the materials (and doping levels) of the optical device 200. Exceeding the current limit can cause thermal break down, which can render the device permanently unusable. Accordingly, optical device 200 can utilize the MOSFET formed therein to induce current compliance by constraining the current in the capacitive structure 240 to magnitudes blow the current limit, thereby mitigating thermal break down in order to protect the device.

For example, the MOSFET can be operated to limit the current flowing through the capacitive structure 240 by applying a gate voltage ($V_{GS}$) to gate 204 to transition the MOSFET into saturation mode. That is, for example, power source 236*b* can be controlled to apply the gate voltage ($V_{GS}$) to gate 204. At the onset of the saturation mode, pinch off occurs that limits the amount of current that can flow into the capacitive structure 240 and creating the conductive channel 232, as described above. Carriers can then flow from source 216 to drain 224 and into to the capacitive structure 240. When the filaments 243 are formed (e.g., the capacitive structure 240 is providing non-volatile retention) in a low resistance state, current flow passes through the waveguide 203, which changes the overall effective refractive index of the waveguide 203 in accordance with Eq. 1 and 2 described above. Using the MOSFET, the current can be controlled by controlling the gate voltage ($V_{GS}$), and subsequently, controlling the resistance state of the memristor, along with the amount of effective refractive index change in the waveguide 203.

Accordingly, in various examples, the MOSFET of optical device 200 can be operated (e.g., by applying a gate voltage) to limit an amount of current flowing through the memristor, so it can control the resistance of the memristor. This can occur by applying a set voltage bias on the memristor, which causes the current to reach the saturation current of the MOSFET (e.g., saturation mode) and setting the resistance of the device higher or lower depending on the saturation current value. For example, the MOSFET can be controlled for current compliance (e.g., limiting current flow to less than the current limit), which can be used to control the switching of the resistive state of the memristor (e.g., a higher current compliance can lead to a lower resistance state, and a lower current compliance will lead to a higher resistance state). This can occur by forming the filamentation layer with the current compliance.

Optical device 200 may also include trenches 235 and 237. Trenches 235 and 237 may be provided for example as air gaps that can operate to confine the optical signal 207 in a horizontal direction. Similarly, the BOX layer 201 confine the optical signal 207 in a vertical direction.

According to some implementations, one or more of the capacitive structures of the example optical device 200 can be utilized for detecting optical signals without extracting light out of a coupled waveguide. For example, FIG. 2B depicts an example implementation of optical device 200 in which the capacitive structure 210 can be implemented to detect optical power of, for example, the optical signal 205 propagating in waveguide 202, without extracting optical signal 205 from the waveguide 202. In this example, the capacitive structure 210 can function as a photodetector based on mid-bandgap defects that convert absorbed photons (e.g., from a received optical signal) into photo-generated carriers. Note that the power source 236*c* and reference numbers of the capacitive structure 240 have been removed in FIG. 2B to assist with ease of illustration and clarity in the depicted figure. Furthermore, FIG. 2B illustrates an example implementation in which the optional electrode 249 is removed.

The waveguide 202 of capacitive structure 210 may have one or more defect sites 233 as depicted in an enlarged view of waveguide 202. The term "defect sites" as used herein may refer to imperfections in the bulk of the material of the waveguide 202, surface imperfections at the boundaries of the waveguide 202, or both. In some examples, the defect sites 233 may be resulted from imperfections in the manufacturing process as well as intentionally created. The existence of the defect sites 233 may absorb photons and cause the generation of free charge carriers relative to the intensity of the optical signal impinging thereon inside the waveguide 202. A conductance of the waveguide 202 depends on the amount of the free charge carriers, such that an increase in the optical signal causes an increase in the conductance of the waveguide 202. Accordingly, upon application of voltage bias across the optical device 200, the defect sites 233 can cause the generation of free charge carriers relative to the intensity of the optical signal inside the waveguide 202. The changes in the conductance within waveguide 202 may cause variations in current passing through the waveguide 202 which can be utilized to monitor the intensity of the optical signal 205 propagating in waveguide 202. For example, a decrease in current passing through the capacitive structure 210 is a result of proportional decrease in conductance because the intensity of the optical signal 205 may have also decreased, which means fewer free charge carriers are generated to change the conductance. This change can be monitored to detect an optical power of the optical signal 205.

In some examples, as shown in FIG. 2B, the optical device 200 can be connected to control circuit 250, which can be used as a control circuit configured to monitor intensity of optical signals propagating within the waveguide 202 based on the detecting variations in current passing through capacitive structure 210. The control circuit 250 may be electrically coupled to the capacitive structure 210. For example, control circuit 250 may be coupled using electrical connection to electrodes 226 and 238, which may represent monitoring sites either collectively or individually. In some examples, control circuit 250 may also be implemented as a control circuit for controlling one or more of power sources 236*a* and 236*b*, as described above.

In some examples, the control circuit 250 may cause capacitive structure 210 to generate electrical signals indicative the intensity of the optical signal propagating within waveguide 202. To affect the generation of the electrical signals, in some examples, the control circuit 250 may include a lock-in amplifier 254 and a pre-amplifier 252. In some examples, the lock-in amplifier 254 may generate a reference variable voltage signal, for example, a sinusoidal signal. The lock-in amplifier 254 may determine a frequency of the reference variable voltage signal based on a conductance of waveguide 202 in the given capacitive structure 210 and a capacitance of capacitive structure 210. In an example, the lock-in amplifier 254 may determine a frequency ($F_0$) of the reference variable voltage signal based on an example relationship:

$$F_0 = \frac{G_{WG}}{2\pi * C} \qquad \text{Eq. 3}$$

where, $G_{WG}$ represents the conductance of the waveguide region in the capacitive structure 210 and C represents the capacitance of the capacitive structure 210. In certain other examples, the frequency ($F_0$) of the reference variable voltage signal may be set to any value greater than.

$$\frac{G_{WG}}{2\pi * C}.$$

The control circuit 250 may apply a reference variable voltage signal to capacitive structure 210 via electrode 226 and 238. The conductance of the waveguide 202 may change depending on the intensities of the optical signal therein. Consequently, the current flowing through the waveguide 202 within may also vary. In particular, the magnitude of electrical current generated by capacitive structure 210 may be influenced by the light intensities within the waveguide 202, because the waveguide conductance changes due to the presence of free carriers created by the absorption of photons at the defect sites 233.

The control circuit 250 may receive the electrical signal generated within a capacitive structure 210 and measure the electrical signals (e.g., electrical currents). The electrical signals are in turn representative of intensities of the optical signals inside a waveguide 202 formed in the capacitive structure 210. In some examples, the electrical currents received by the control circuit 250 from the capacitive structure 210 may be weak in strength. The pre-amplifier 252 may amplify the electrical currents for further processing by the lock-in amplifier 254.

During operation, to monitor the optical power (e.g., light intensity) of optical signal 205, the control circuit 250 may apply the reference variable voltage signal (e.g., sometimes referred to herein as a reference bias) to electrodes 226 and 238 and measure electrical current at the one of the electrodes. As previously noted, changes in the signal intensities inside the waveguide 202 may cause changes in the conductance of the waveguide 202. Consequently, the current flowing through the respective capacitive structure 210 may vary. Such current flowing through the respective capacitive structure 210 may be monitored by the control circuit 250 at the one of the electrodes.

While FIG. 2B depicts capacitive structure 210 leveraged to monitor optical power of optical signal 205 in waveguide 202, examples disclosed herein are not limited to only capacitive structure 210. In some examples, capacitive structure 240 can be used to monitor the optical power of optical signal 207 in waveguide 203, for example, based on defect sites contained in the waveguide 203. In some examples, both capacitive structures 210 and 240 may be used to monitor optical power of an optical signal in a respective waveguide 202 and 203.

Figure 3:
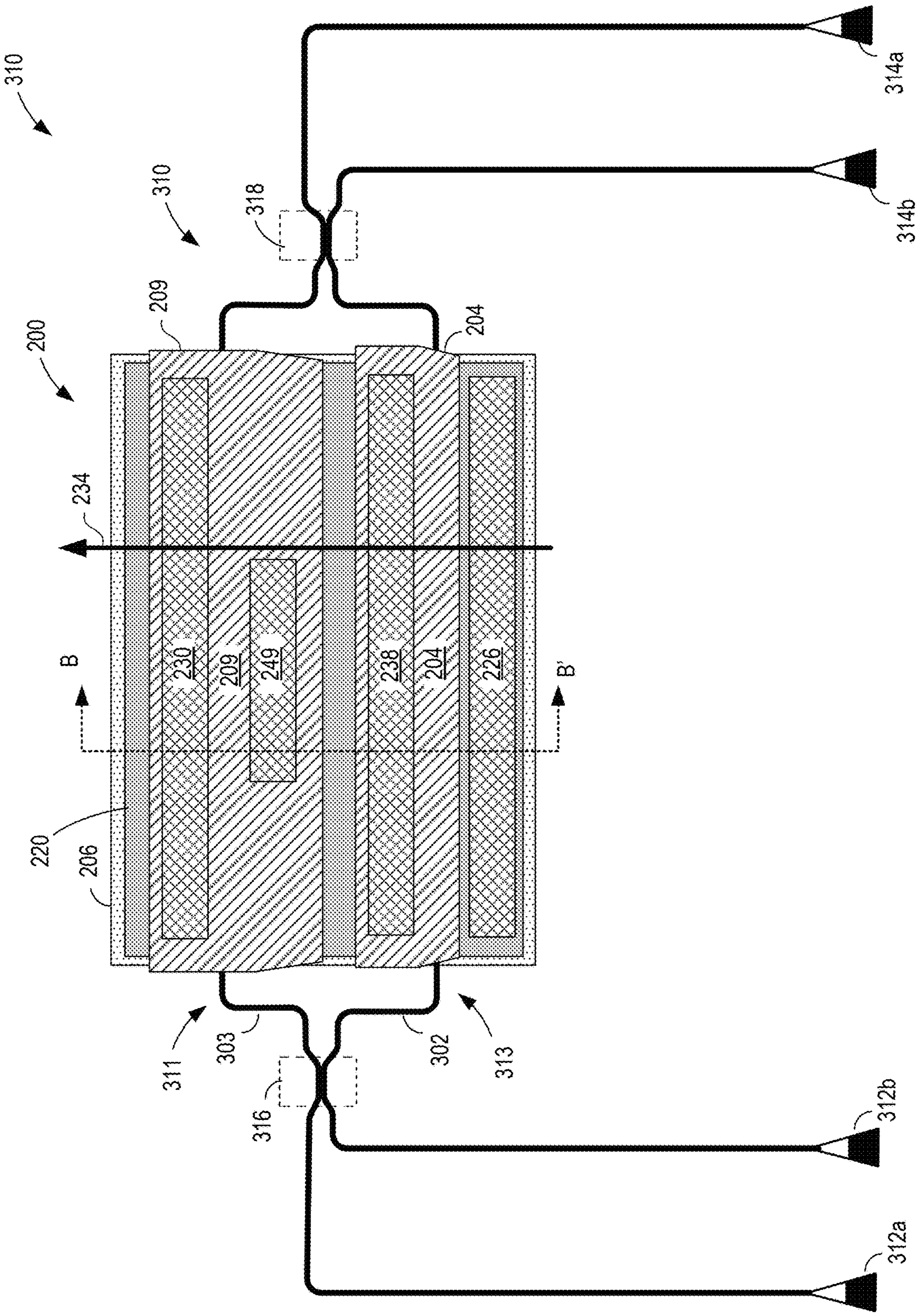
FIG. 3 depicts a schematic diagram of an optical device in implemented as a Mach-Zehnder Interferometer in accordance with an example disclosed herein.

FIG. 3 depicts a schematic diagram of an optical device 300 in implemented as a Mach-Zehnder Interferometer in accordance with an example disclosed herein. Optical device 300 may be an example PIC that can be provided on a chip. In various examples, optical device 300 may be integrated into a silicon photonics platform.

The optical device 300 according to the example shown in FIG. 3 comprises a MZI 310 and the optical device 200, depicted as a top down view of the optical device 200. Arrow 234 represents a direction of current flow according to the examples described above in connection with FIG. 2A, for example, the direction of current flow of conductive channel 232. FIG. 3 also illustrates line B-B', which can be an example line along with the cross section of optical device 200 is taken.

Optical device 300, according to this example, is provided as MZI 310 comprising waveguides 303 and 302 that guide propagation of an optical signal input into an input port 312*a* and 312*b*, respectively. For example, MZI 310 may comprise a arm 311 formed of a waveguide 303 having input port 312*a* and arm 313 formed of a waveguide 302 having input port 312*b*.

An optical signal input, for example by an optical source (not shown) into an input port of one of the waveguides can be optically coupled into the other waveguide by a coupler 316. An amount of the optical signal coupled into one waveguide from the other is based on a coupling efficiency of coupler 316. For example, a portion of an optical signal supplied to input port 312*a* can be coupled into waveguide 302 according to the coupling efficiency of the coupler 316. In various examples, the coupling efficiency of coupler 316 may be 50%, such that equal amount of the input optical remains in waveguide 303 (e.g., in arm 311) and is coupled into waveguide 302 (e.g., into arm 313). Coupler 316, according to illustrative examples, may be a directional coupler configured to evanescently couple an optical signal between adjacent waveguides.

In the example of FIG. 3, the optical device 200 is integrated with the MZI 310, such that the waveguides 302 and 303 are coupled to the optical device 200. In the example of FIG. 3, the power sources and corresponding connections are not shown for illustrative purposed only. In this case, the waveguide 303 may be an example of waveguide 203 of FIG. 2A and the waveguide 302 may be an example of waveguide 202 of FIG. 2A. Thus, an optical signal propagating in the arm 311 may be an example of optical signal 207, while an optical signal propagating in the arm 313 may be an example of optical signal 205.

As such, the optical device 200 can be utilized as described above in connection with FIG. 2A. For example, a voltage bias can be applied between electrodes 230 and 226 to induce a change in the effective index of refraction of waveguide 302, which alters optical phase shift ($\Delta\varphi$) in the optical signal therein, as described above in connection with FIGS. 1A-2A. Furthermore, a voltage bias can be applied across electrodes 226 and 238 to form the conductive channel 232 in the MOSFET of optical device 200, thereby increasing the modulation depth of the optical phase shift ($\Delta\varphi$) in the waveguide 302, as described above in connection with FIGS. 1A-2A.

The optical phase shift provided in waveguide 302 can be utilized to encode/decode information on optical signals based on destructive/constructive interface at the output of the MZI 310. For example, information can be encoded/decoded by modulating the phase of waveguide 302 relative to the waveguide 303. The optical signals on each arm 311 and 313 can be combined by a coupler 318, which may be substantively similar to coupler 316, resulting in constructive and/or destructive interference between optical signals from each arm. The interference causes amplitude modulation, which can encode information onto and/or decode information from the optical signal input in the MZI 310, for example, by monitoring optical power at an output port 314*a* and/or 314*b*.

In some examples, in combination or alternatively with the above example, the optical device can comprise non-volatile retention as described above in connection with FIG. 2A. For example, a voltage can be applied across the capacitive structure 240 (not highlighted in FIG. 3 as the various layers making up capacitive structure 240 include and are under the cathode 209) via optional electrode 249 and electrode 230, to operate the device in low resistance state and provide non-volatile memristive behavior with the capacitive structure 240. The capacitive structure 240, in this example, comprises the waveguide 303 as an example implementation of waveguide 203.

In one example, the memristive behavior may provide for non-volatile phase tuning, which can provide for passband tuning for optical filtering by the optical device 200. For example, MZI 310 may receive an input optical signal at the input port 312*a*, which is split into arm 311 and arm 313 according to a coupling coefficient of coupler 316. The portion of waveguide 303 overlapping with the optical device 200 may experience a phase shift due to the memristive behavior, as described above in connection with FIG. 2A. The phase shift can be controlled based on adjusting the voltage bias across the optional electrode 249 and electrode 230 to tune a resonance frequency via a setting voltage bias, thereby inducing a non-volatile phase-shift applied to the optical signal propagating along arm 311. The optical signals propagating in the arms 311 and 313 can then be combined by a coupler 318, resulting in constructive and/or destructive interference between optical signals from each arm.

In some example use cases, non-volatile phase tuning provided the memristive behavior can be used in photonic neural networks. For example, non-volatile phase tuning of a given optical device can be implemented to store a weight of the neural network. A collection of optical devices according to this example can store a number of weights enabling in-memory photonic processing.

Additional examples of memristive behavior can be found in, for example, U.S. application Ser. No. 18/382,657, the disclosure of which is incorporated herein by reference in its entirety.

In some examples, optical device 200 can be utilized for monitoring optical signals in the MZI 310 without extracting light out of a waveguides 302 or 303. For example, as described above in connection with FIG. 2B, the capacitive structure 210 can function as a photodetector based on mid-bandgap defects that convert absorbed photons (e.g., from a received optical signal) into photo-generated carriers, for example, based on defect sites comprised in a waveguide. In an example implementation, waveguide 302 may contain defect sites (e.g., defect sites 233) that can cause the generation of free charge carriers relative to the intensity of the optical signal inside the waveguide 302. Changes in the conductance within waveguide 302 may cause variations in current passing through the waveguide 302 which can be utilized to monitor the intensity of an optical signal propagating in waveguide 302, for example, using a feedback or control circuit (e.g., control circuit 250) as described above in connection with FIG. 2B.

While the foregoing describes monitoring optical power of optical signal in waveguide 302, examples disclosed herein are not limited thereto. In some examples, the optical power on waveguide 302 or a combination of waveguides 302 and 303 may be monitored, for example, based on defect sites contained in waveguides 303 and/or 304.

By monitoring the optical power in one waveguide, examples disclosed herein can also monitor the optical power of an optical signal on the other waveguide. For example, as described above, coupler 316 can couple a portion of an optical signal supplied to input port 312*a* into waveguide 302 and the remainder of the optical signal continues along waveguide 303. Thus, the optical power on waveguide 303 can be estimated based on detecting the optical power on the waveguide 302. Estimating the optical power, in this example, on waveguide 303 is based on the optical power detected in waveguide 302 and the coupling efficiency. For example, in a case where the coupling efficiency of coupler 316 may be 50%, equal amounts of the input optical in waveguide 303 (e.g., in arm 311) and in waveguides 302 (e.g., into arm 313). In this case, detecting an optical power in arm 313 informs on the optical power the in arm 311, which may be expected to be approximately equal.

In some examples, monitoring the optical power in a waveguide can be used to monitor and tune optical phase shift induced by the waveguide. For example, as described, a voltage bias can be applied between electrodes 230 and 226 to induce a change in the effective index of refraction of waveguide 302, which alters optical phase shift ($\Delta\varphi$). By monitoring the optical power in the waveguide 302 as described above, the magnitude of voltage bias can be adjusted to a desired amount of optical phase shift. Similarly, in the case of setting and/or resetting non-volatile retention of the memristive structure, optical power monitored in waveguide 302 and be used to inform the whether the voltage bias applied across electrodes 249 and 230 is sufficient set or reset the device.

Figure 4:
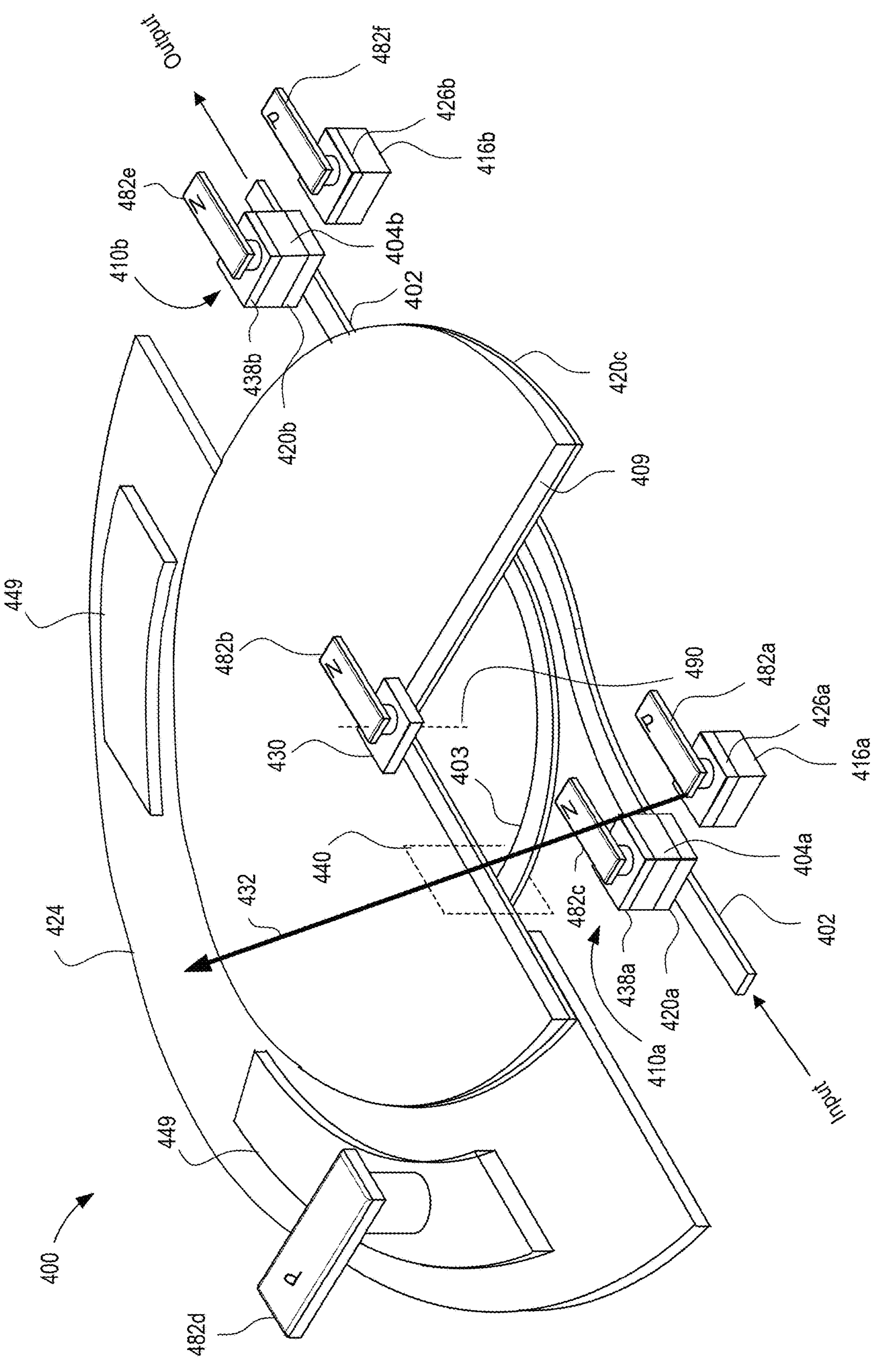
FIG. 4 illustrates an example optical device implemented as a ring resonator in accordance with an example disclosed herein.

FIG. 4 illustrates an example optical device 400 implemented as a ring resonator in accordance with an example disclosed herein. Optical device 400 may be an example PIC that can be provided on a chip. In various examples, optical device 400 may be integrated into a silicon photonics platform.

The optical device 400 is an example of a resonator-based implementation of the optical device 200 of FIGS. 2A and 2B. In some examples, optical device 400 is implemented as a microring resonator (MRR). Optical device 400 includes a resonator structure 403 optically coupled to the bus waveguide 402. In the example of FIG. 4, the resonator structure 403 is provided as a resonator structure 403 that evanescently couples to the bus waveguide 402. The bus waveguide 402 may be an example implementation of waveguide 202 of FIGS. 2A and 2B, and resonator structure 403 may be an example implementation of waveguide 203. Thus, for example, bus waveguide 402 and resonator structure 403 may be formed in a device region, such as device layer 206 of FIG. 2. The device layer or device region is not shown in FIG. 4 for illustrative purposes only so to clearly depict the various structures formed in the device layer. However, it will be appreciated that the device layer (or device region as referred to herein) would be present in forming the optical device 400 similar to optical device 100 and/or 200 described above.

The resonator structure 403 may be a closed loop structure around a central axis 490 having a shape that is circular, thereby forming a ring resonator or cavity. However other shapes are possible, for example but not limited to, elliptical, a racetrack shape, etc. An optical signal (e.g., optical signal 205) may be received at an input end of the bus waveguide 402 and a portion coupled into resonator structure 403 (e.g., optical signal 207 in this example) based on a coupling efficiency of the evanescent coupling. The optical signal propagating in resonator structure 403 resonates therein and is coupled back onto the bus waveguide 402, thereby combining the optical signal from resonator structure 403 with that on bus waveguide 402. The combined optical signal can be output from the output end of the bus waveguide 402. In various implementations, the resonator structure 403 and bus waveguide 402 may be formed of a semiconductor material, such as silicon or other Group IV material.

The resonator structure 403 may have a resonance wavelength defined based on the round-trip length of the resonator structure. In the case of evanescent coupling, the amount of light optically coupled into and out of the resonator structure 403 is based on a distance between the waveguides and the resonance frequency of the resonator structure 403. The amount of light optically coupled can be represented by a coupling coefficient. The distance between waveguides can be controlled so to bring the resonator structure 403 as close as possible to bus waveguide 402. The coupling length represents an effective curve length of the resonator structure 403 for the coupling phenomenon to happen with the waveguide, which can be based on a radius of curvature of the resonator structure 403 where the evanescent coupling is to occur. In the case of FIG. 4, the radius of the resonator structure 403 may be designed to achieve a desired curve length for a desired resonance frequency. The resonance frequency is also dependent on effective refractive indices between the bus waveguide 402 and the resonator structure 403.

In the example disclosed herein, the optical device 400 includes a MOSFET formed on a substrate (not shown in FIG. 4 for illustrative purposes only). The substrate may be substantially similar to the substrate 108 and/or 208 of FIGS. 1-2B. The MOSFET can be formed between a source 416*a*, gate 404*a*, and drain 424. The source 416*a*, gate 404*a*, and drain 424 may be example implementations of source 216, gate, 204, and drain 224, respectively. Thus, for example, the drain 424 can be formed as a first doped region in a device region, the source 416*a* can be formed as a second doped region in the device region, and the gate 404*a* can be formed on the device region. The gate 404*a* can comprise the second material, such as but not limited to, a Group III-V material. A conductive channel 432 (shown as an arrow) can be formed in the device region between the source 416*a* to the drain 424 based on applying a voltage bias to the gate 404*a*. The bus waveguide 402 can be formed between the region in which the conductive channel 232 is formed and the gate 404*a*.

While the conductive channel 432 is schematically shown as an arrow, the actual shape of the conductive channel 432 is not intended to be limited to the depicted arrow. The conductive channel 432 may be dependent on the materials (and doping levels) of the optical device 400, as well as the voltage bias applied across the device.

In the example of FIG. 4, optical device 400 comprises additional structures in addition to the MOSFET structure constituted as the source 416*a*, drain 424, and gate 404*a*. For example, optical device 400 comprises a capacitive structure 410*a*, which is substantially similar to the capacitive structure 210 of FIGS. 2A and 2B, and comprises the gate 404*a*. For example, capacitive structure 410 includes the gate 404*a* acting as a cathode formed on the bus waveguide 402. The optical device 400 also includes an anode formed in the device region and comprises the bus waveguide 402. The anode and cathode may be substantially similar to anode 214 and cathode 212 of FIGS. 2A and 2B. For example, the anode adjoins the cathode, thereby defining the capacitive structure 410, which may be implemented as a MOSCAP. Additionally, a dielectric 420*a* is formed between the cathode (e.g., the gate 404*a*) and the anode (e.g., the bus waveguide 402). The dielectric 420*a* can be substantially similar to dielectric 220 of FIGS. 2A and 2B.

Accordingly, the capacitive structure 410 can be utilized to induce a phase shift modulation in the bus waveguide 402, for example, by applying a voltage bias across the first and electrodes 426*a* and 430. That is, for example, a power source (not shown in FIG. 4, but substantially similar to power source 236*a* of FIGS. 2A and 2B) can connected to terminals 482*a* and 482*b* and controlled (e.g., by a control circuit) to apply a voltage bias, which can be tuned to induce carrier accumulation or duplication around the dielectric 420*a*. Thus, as described above, an optical signal on bus waveguide 402 can be phase shifted based on changes in the refractive index induced by applying the voltage bias to the capacitive structure 410.

The MOSFET of optical device 400 can be driven to increase the modulation depth of optical phase shift by increasing the voltage-induced Δneff of Eq. 1. That is, as explained above in connection with FIGS. 1-2B, an electrode 438*a* having terminal 482*c* may be disposed on the gate 404*a* and a gate voltage ($V_{GS}$) can be applied, for example, by a power source (e.g., not shown but substantially similar to power source 236*b*), connected between the electrodes 438*a* and 426*a*. The power source may be controlled (e.g., by a control circuit) so to apply a gate voltage ($V_{GS}$) in a manner to operate the MOSFET in saturation mode and form the conductive channel 432. The channel length of the conductive channel 432 can be modulated by increasing the voltage bias, which can function to alter carrier concentration within the region of the bus waveguide 402 and altering the change in carrier density (ΔN) of Eq. 1.

Additionally, in the example of FIG. 4, optical device 400 may comprise another capacitive structure 440 connected in series to the MOSFET. More particularly, the capacitive structure 440 can be connected in series to the drain 424 of the MOSFET. The capacitive structure 440 comprises the resonator structure 403 and a cathode 409 formed on the waveguide 403. The cathode 409 may comprise the second material and be substantially similar to the cathode 209 of FIGS. 2A and 2B. In the example of FIG. 4, electrode 430 is formed on the cathode 409, for example, within a central region of the resonator structure 403 (e.g., along the central axis 490 as shown in the example of FIG. 4). The capacitive structure 440 also includes an anode formed in the device region and comprises the resonator structure 403. The anode (e.g., resonator structure 403) may be connected to the electrode 426*a* via the device region and connected in series with the drain 424, for example, via the cathode 409. The anode (e.g., resonator structure 403) adjoins the cathode 409, thereby defining the capacitive structure 440 between the anode and the cathode 409. In various examples, the cathode 409 comprises Group III-V material as the second material, in which case the capacitive structure 440 may be considered a MOSCAP.

As with capacitive structure 410, a dielectric 420*c* is formed between the cathode 409 and the anode (e.g., resonator structure 403). The dielectric 420*c* may be an electrically insulating material formed between the cathode 209 and the anode (e.g., resonator structure 403), and the polarization of the dielectric 420*c* by an applied electric field may increase the surface charge of the capacitive structure 440 for a given electric field strength. In various examples, the cathode 409 and gate 404*a* are formed of the same material, in which case the dielectric 420*c* may be a connected layer formed of a common oxide. In another example, the cathode 409 and gate 404*a* may be different Group III-V materials, in which case it may be beneficial to provide the dielectric 420*c* as separate dielectrics having oxides for the materials forming the cathode 409 and gate 404*a*.

In the example of FIG. 4, the dielectric 420*c* and cathode 409 are shown with a portion remove for illustrative purposes. That is, for example, the dielectric 420*c* and cathode 409 may be provided as cylindrical structures having a full circular profile when viewed along central axis 490. In order to show the resonator structure 403 formed under the dielectric 420*c*, a piece of the dielectric 420*c* and cathode 409 is not shown.

The optical device 400, according to some example, can be utilized at an optical modulator with improved optical modulation, described above in connection with FIG. 2A. For example, a voltage bias can be applied between electrodes 430 and 426*a* to induce a change in the effective index of refraction of waveguide 402, which alters optical phase shift (Δφ) in the optical signal therein, as described above in connection with FIGS. 1A-2A. Furthermore, a voltage bias can be applied across electrodes 426*a* and 438 to form the conductive channel 432 in the MOSFET of optical device 400, thereby increasing the modulation depth of the optical phase shift (Δφ) in the waveguide 402, as described above in connection with FIGS. 1A-2A.

The optical phase shift provided in waveguide 402 can be utilized to encode/decode information on optical signals based on destructive/constructive interface at the output of the optical device 400. For example, information can be encoded/decoded by modulating the phase of waveguide 402 relative to the waveguide 403, resulting in constructive and/or destructive interference between optical signals. The interference causes amplitude modulation, which can encode information onto and/or decode information from the optical signal input in to waveguide 402.

In some examples, the capacitive structure 440 may be leveraged as a memristor to provide non-volatile retention. In this case, the resonator structure 403 may be formed of a third doped region, as described above in connection with FIG. 2A. Applying an electric field across the capacitive structure 440 can form a filamentation layer in the capacitive structure 440 that provides for memristive behavior in the form of non-volatile retention. For example, as described above, a power source (not shown in FIG. 4 but substantially similar to power source 236*c*) can be connect to electrode 430 and one or more of optional electrodes 449. A voltage bias can be applied across the capacitive structure 440, which generates charge trap regions and a conductive path that remain after the voltage bias is removed, thereby providing non-volatile retention, for example as explained in more detail above in connection with FIG. 2B.

The MOSFET of optical device 400 can be operated to limit the current flowing through the capacitive structure 440 by applying a gate voltage ($V_{GS}$) to gate 404*a* to transition the MOSFET into saturation mode, as described above in connection with FIG. 2A. Accordingly, in various examples, the MOSFET of optical device 400 can be operated to limit an amount of current flowing through the memristor, so it can control the resistance of the memristor.

In one example, the memristive behavior may provide for non-volatile phase tuning, which can provide for passband tuning for optical filtering by the optical device 200. In this case, the optical device may function as an optical filter. For example, waveguide 402 may receive an input optical signal, which can be coupled into the resonator structure 403 based on the coupling coefficient and a resonance frequency of the resonator structure 403. The resonator structure 440 may exhibit non-volatile retention in which the refractive index of the resonator structure 440 is tuned based on a voltage bias applied across optional electrode 249 and electrode 230. The change in refractive index causes a phase shift that tunes the resonance frequency of the resonator structure 403. The tunning can be used to non-volatilely set the resonance frequency, which tunes the coupling of an optical signal in bus waveguide 402 into the resonator structure 402. This control can be used, for example, to filter undesired wavelengths of light of the optical signal, as well as for encoding/decoding information through frequency modulation (e.g., tuning wavelengths on the optical signal output from optical device 400).

According to some implementations, one or more of the capacitive structures of optical device 400 can be utilized for detecting optical signals without extracting light out of a coupled waveguide. For example, capacitive structure 410*a* can be implemented to detect optical power of the optical signal input into the bus waveguide 402, without extracting the optical signal. In this example, as described above in connection with FIG. 2B, the capacitive structure 410 can function as a photodetector based on mid-bandgap defects that convert absorbed photons (e.g., from a received optical signal) into photo-generated carriers. That is, for example, bus waveguide 402 may contain defect sites (e.g., defect sites 233 of FIG. 2B) that can cause the generation of free charge carriers relative to the intensity of the optical signal inside the bus waveguide 402. Changes in the conductance within bus waveguide 402 may cause variations in current which can be utilized to monitor the intensity of an optical signal propagating in bus waveguide 402, for example, using a feedback or control circuit as described above in connection with FIG. 2B.

In an example, optical device 400 can include an additional optional capacitive structure 410*b*. The capacitive structure 410*b* may be substantially similar to capacitive structure 410*a*, thereby comprising a source 416*b*, gate 404*b* formed on bus waveguide 402, and dielectric 420*b*, which together with drain 424 constitute a second MOSFET. This MOSFET can be driven, for example by applying a voltage bias across electrode 426*b* (via terminal 482*f*) and electrode 438*b* (via terminal 482*e*) similar to the MOSFET formed using the capacitive structure 410*a*, which may induce an optical phase shift on the optical signal output from the optical device 400. The second MOSFET may also be used to form a second conductive channel (not shown) similar to conductive channel 432.

In various example, capacitive structure 410*b* can be implemented to detect optical power of the optical signal output at an output of bus waveguide 402, without extracting the optical signal. As described above in connection with FIG. 2B, the bus waveguide 402 of the capacitive structure 410*b* may contain defect sites (e.g., defect sites 233 of FIG. 2B) that can cause the generation of free charge carriers relative to the intensity of the optical signal inside the bus waveguide 402, which can be utilized to monitor the intensity of an optical signal propagating at the output of bus waveguide 402, for example, using a feedback or control circuit as described above in connection with FIG. 2B.

Figure 5:
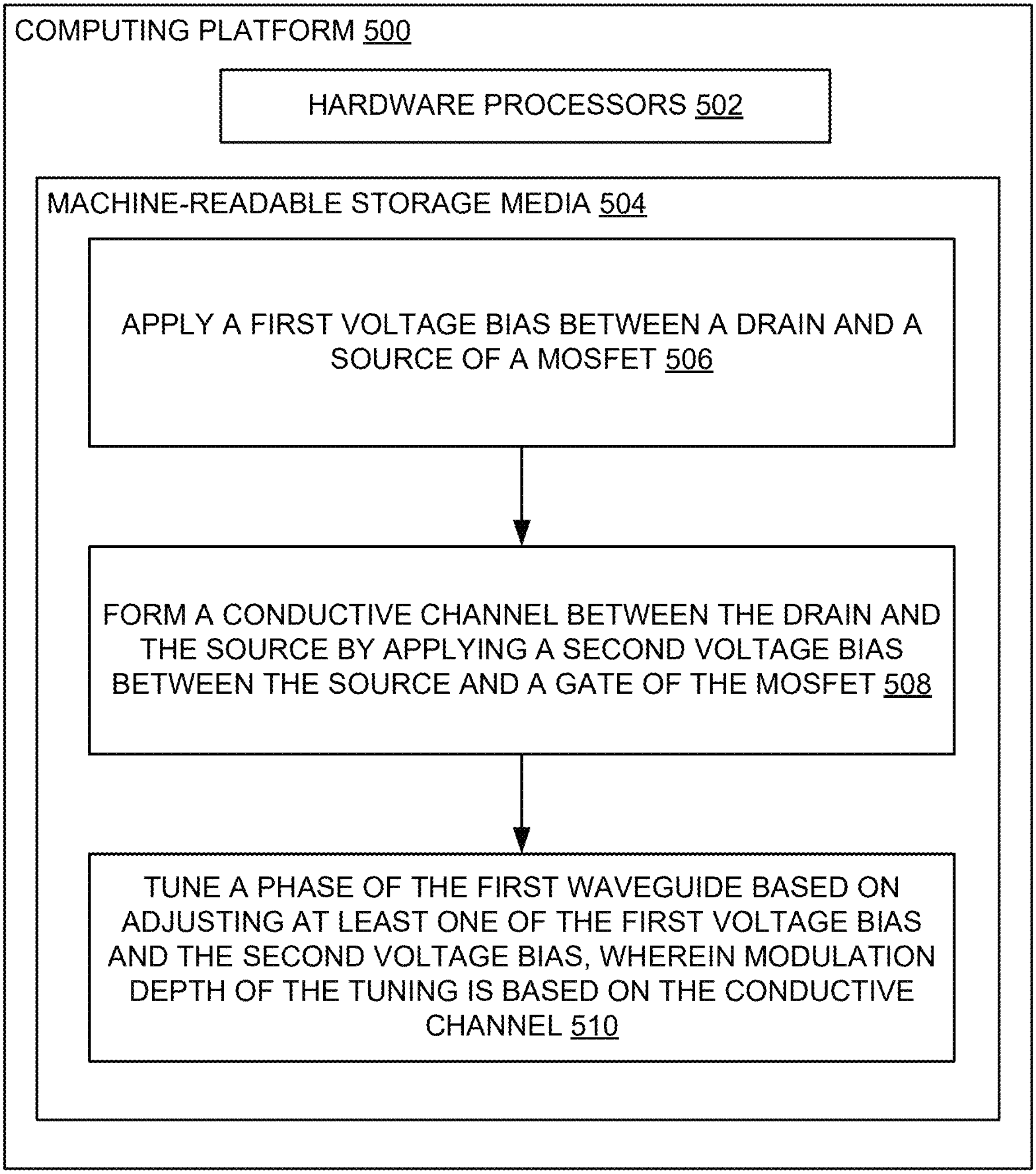
FIG. 5 is an example computing component that may be used to implement various features of optical devices in accordance with the implementations disclosed herein.

FIG. 5 illustrates an example computing component that may be used to operate optical devices in accordance with various embodiments. Referring now to FIG. 5, computing component 500 may be, for example, a server computer, a controller, or any other similar computing component capable of processing data. In the example implementation of FIG. 5, the computing component 500 includes a hardware processor 502, and machine-readable storage medium for 504.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-510, to control processes or operations for controlling optical devices and PICs disclosed herein. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term “non-transitory” does not encompass transitory propagating signals. As described in detail below, machine-readable storage medium 504 may be encoded with executable instructions, for example, instructions 506-510.

Hardware processor 502 may execute instruction 506 to apply a first voltage bias between a drain and a source of a MOSFET. The MOSFET may be formed, for example, in the optical devices described in connection with FIGS. 1A-2B. In these examples, the MOSFET comprises the drain formed in a device layer comprising a first doped region in a first material (e.g., silicon or other Group IV material), the source formed in the device layer comprising a second doped region in the first material, and the gate comprising a second material (e.g., a Group III-V material) formed on the device layer.

Hardware processor 502 may execute instruction 508 to form a conductive channel between the drain and the source by applying a second voltage bias between the source and a gate of the MOSFET. In this case, for example, the first waveguide can be provided between the gate and the conductive channel Hardware processor 502 may execute instruction 510 to tune the phase of the first waveguide based on adjusting at least one of the first voltage bias and the second voltage bias, wherein modulation depth of the tuning is based on the conductive channel. For example, as described above in connection with FIGS. 1A-2B, applying a voltage across the source and drain (e.g., the first voltage bias) can change carrier concentration in a first waveguide that adjusts a phase of the first waveguide. Additionally, in some examples, the modulation depth of the phase shift in the first waveguide can be adjusted (e.g., increased) based on the conductive channel, as described above in connection with FIGS. 1A-2B. Accordingly, by adjusting the second voltage bias the range of the modulation can be adjusted, which may enable increased granularity in the tuning of the phase due to the first voltage.

In some examples, as described above in connection with FIGS. 3 and 4, the MOSFET can be coupled to one of a resonator structure and a MZI. For example, as described in connection with FIG. 3, the MOSFET may be formed in a first capacitive structure (e.g., capacitive structure 210 as shown in FIGS. 2A-3) coupled to a first arm of the MZI (e.g., arm 313 of FIG. 3), while a second capacitive structure (e.g., capacitive structure 240 as shown in FIGS. 2A-3) us coupled to a second arm (e.g., arm 311). While, in the example of FIG. 4, the MOSFET may be formed in a first capacitive structure (e.g., capacitive structure 410 of FIG. 4) and coupled to a resonator structure (e.g., resonator structure 403 of FIG. 4) comprised in a second capacitive structure (e.g., capacitive structure 440). In either case, a phase shift of a waveguide (e.g., waveguide 203, 303 and/or the resonator structure 403) of the second capacitive structure can be tuned to a non-volatile phase shift (e.g., non-volatile retention as described above in connection with FIGS. 2A-4) by applying a third voltage bias across the second capacitive structure. The conductive channel formed by the MOSFET can then function as a current compliance that can limit the current flowing through the capacitive structure to below a current compliance threshold and mitigates thermal breakdown. The current compliance threshold may be dependent on the materials (and doping levels) of the device, as well as the third voltage bias applied across the device.

In some examples, instruction 510 may be executed by hardware processor 502 to adjust the at least one of the first voltage bias and the second voltage bias based on monitoring optical signals without extracting the optical signal from the device. For example, as described above in connection with FIG. 2B, the first waveguide may contain defect sites, which generate of free charge carriers relative to the intensity of the optical signal. Monitoring the current passing through the MOSFET can then be used to detect optical power. Thus, for example in the case of a the MZI and/or resonator structure described above, an optical power in one waveguide can be monitored to estimate the optical power in another waveguide and the tuning of the voltage bias can be adjusted based on the detected optical power.

Figure 6:
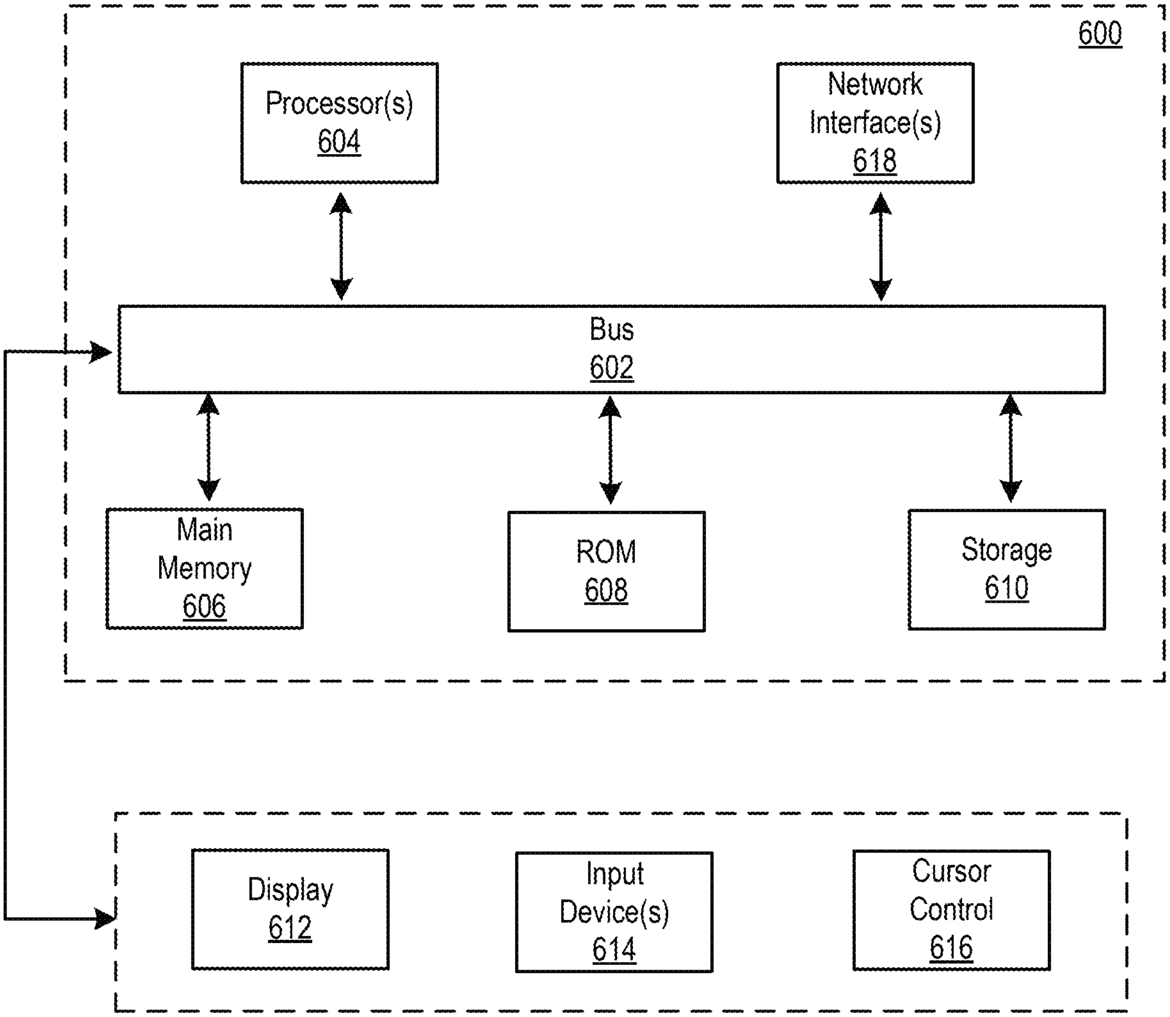
FIG. 6 is an example computer system that may be used to implement various features of optical devices of the present disclosure.

FIG. 6 depicts a block diagram of an example computer system 600 in which various of the embodiments described herein may be implemented. Computer system 600 may be an example implementation of control circuit 150 of FIG. 1 and/or control circuit 250 of FIGS. 2A and 2B. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a network interface 618 (also referred to as a communication interface) coupled to bus 602. Network interface 618 provides a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 618, which carry the digital data to and from computer system 600, are example forms of transmission media.

The computer system 600 can send messages and receive data, including program code, through the network(s), network link and network interface 618. In the Internet example, a server might transmit a requested code for an application program through the Internet, the ISP, the local network and the network interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical device comprising:

a substrate;

a device layer formed on the substrate and comprising a first material;

a metal-oxide-semiconductor field-effect transistor (MOSFET) formed on the substrate, the MOSFET comprising:

a drain formed in the device layer comprising a first doped region;

a source formed in the device layer comprising a second doped region;

a gate comprising a second material formed on the device layer; and a conductive channel formed in the device layer based on a voltage bias applied to the gate; and a first optical waveguide formed between the gate and the conductive channel.

2. The optical device of claim 1, wherein the first and second doped regions comprise a first doping polarity.

3. The optical device of claim 2, wherein the first material is doped with a first doping concentration and the first doping polarity, wherein the first and second doped regions comprise a second doping concentration that is higher than the first doping concentration.

4. The optical device of claim 2, wherein the second material comprises a second doping polarity that is the opposite of the first doping polarity.

5. The optical device of claim 4, wherein the first doping polarity is p-type doping and the second doping polarity is n-type doping.

6. The optical device of claim 1, further comprising:

a first trench formed between the first doped region and the first optical waveguide; and a second trench formed between the second doped region and the first optical waveguide.

7. The optical device of claim 1, further comprising:

a memristor connected in series to the drain via the conductive channel.

8. The optical device of claim 7, wherein the memristor is formed in the device layer and comprises a third doped region above the conductive channel, the optical device further comprising a third trench between the second doped region and the third doped region.

9. The optical device of claim 1, wherein the second material comprises a Group III-V semiconductor material, and wherein the optical device further comprises a metal oxide semiconductor (MOS) capacitor comprising the gate and the first optical waveguide.

10. The optical device of claim 1, further comprising:

a Mach-Zehnder Interferometer including a first arm and a second arm, wherein the first arm comprises the first optical waveguide and the second arm comprises a second optical waveguide, wherein the first doped region is between the first and second optical waveguides.

11. The optical device of claim 1, further comprising:

a resonator structure formed in the device layer and optically coupled to the first optical waveguide, wherein the resonator structure is connected in series to the drain.

12. A method, comprising:

applying a first voltage bias between a drain and a source of a metal-oxide-semiconductor field-effect transistor (MOSFET);

forming a conductive channel between the drain and the source by applying a second voltage bias between the source and a gate of the MOSFET, wherein a first waveguide is between the gate and the conductive channel; and tuning a phase of the first waveguide based on adjusting at least one of the first voltage bias and the second voltage bias, wherein modulation depth of the tuning is based on the conductive channel.

13. The method of claim 11, wherein the source, the drain, and the first waveguide are formed in a device layer, and wherein the conductive channel is formed in a region of the device layer below the first waveguide.

14. The method of claim 11, further comprising:

tuning a phase shift of a second waveguide to a non-volatile phase shift by applying a third voltage bias to a capacitive structure connected in series to the drain of the MOSFET, the capacitive structure comprising the second waveguide; and limiting current through the capacitive structure based on the conductive channel.

15. The method of claim 14, wherein the capacitive structure comprises one of a resonator structure and an arm of a Mach-Zehnder Interferometer.

16. The method of claim 14, wherein tuning the phase shift of the first waveguide further comprises:

forming a filamentation layer in the capacitive structure between a second waveguide and semiconductor material of the capacitive structure by applying the third voltage bias;

producing charge trap regions in a buried oxide layer based on forming the filamentation layer, the buried oxide layer provided between a substrate and a device layer that comprises the second waveguide; and creating a conductive path in the buried oxide layer by trapping charge within the charge trap regions such that the capacitive structure operates as a resistor, wherein the conductive path causes a change in a phase of the second waveguide.

17. The method of claim 11, further comprising:

receiving an input optical signal by the first waveguide, wherein the input optical signal is coupled into a second waveguide; and monitoring an optical power of the optical signal in the first waveguide based on defect sites in the second waveguide;

wherein adjusting the at least one of the first voltage bias and the second voltage bias is based on the monitored optical signal.

18. A photonic integrated circuit (PIC) comprising:

a device layer comprising a first material;

a first capacitive structure comprising a first anode formed in the first material and comprising a first waveguide, a first cathode comprising a second material, and a dielectric layer disposed between the first cathode and the first anode; and a metal-oxide-semiconductor field-effect transistor (MOSFET) comprising:

a source and a drain formed in the device layer; and a gate comprising the cathode, wherein a conductive channel is formed in a region of the device layer based a first voltage bias applied to the gate, and wherein the first waveguide is between the gate and conductive channel.

19. The PIC of claim 18, further comprising:

a second capacitive structure electrically connected in series to the MOSFET, the second capacitive structure comprising a second anode formed in the first material and comprising a second waveguide, a second cathode comprising the second material, wherein the dielectric layer is between the second cathode and the second anode, wherein the second capacitive structure exhibits a non-volatile change in an index of refraction of the second waveguide based on a second voltage applied across the second capacitive structure.

20. The PIC of claim 19, wherein the second capacitive structure is formed in one of a resonator structure optically coupled to the first waveguide and an second arm of a Mach-Zehnder Interferometer (MZI) in which the first capacitive structure is formed in a first arm of the MZI.

* * * * *